United States Patent
Austin et al.

(10) Patent No.: US 6,856,922 B1
(45) Date of Patent: Feb. 15, 2005

(54) SYSTEM AND METHOD FOR BATTERY MANAGEMENT USING HOST PROCESSING

(75) Inventors: Steven E. Austin, Penn Valley, CA (US); Dale F. Stolitzka, Los Altos, CA (US)

(73) Assignee: Analog Devices, Inc., Norwood, MA (US)

( * ) Notice: Subject to any disclaimer, the term of this patent is extended or adjusted under 35 U.S.C. 154(b) by 136 days.

(21) Appl. No.: 10/314,529

(22) Filed: Dec. 9, 2002

(51) Int. Cl.⁷ .............................. G06F 19/00; H02J 7/00
(52) U.S. Cl. .......................... 702/63; 702/64; 702/65; 320/132; 320/134
(58) Field of Search ............................ 702/57, 60, 63, 702/64, 65, 182, 186; 320/113, 132, 136, 128, 134

(56) References Cited

U.S. PATENT DOCUMENTS 5,541,489 A * 7/1996 Dunstan ..................... 320/134
6,169,387 B1 * 1/2001 Kaib ......................... 320/132
6,486,636 B1 * 11/2002 Stolitzka et al. ............ 320/134

OTHER PUBLICATIONS

POWERSMART Preliminary PS331, *Multi Chemistry Smart Battery Monitor*, Sep. 18, 2000, p. 1–10.
Smart Battery System Specifications, *Smart Battery System Manager Specification*, Benchmarq Microelectronics, Inc., 1998, p. 1–22.
Maxim, *Digitally Controlled Fuel–Gauge Interface*, MAX1660, p. 1–20.
UNITRODE, bq2092 *Gas Gauge IC with SMBUS–Like Interface*, 6/99, p. 1–28.
BENCHMARQ Products bq2040, *Gas Gauge IC with SMBUS Interface*, Jun. 1999, p. 1–32.

* cited by examiner

*Primary Examiner*—Bryan Bui
(74) *Attorney, Agent, or Firm*—Koppel, Jacobs, Patrick & Heybl

(57) ABSTRACT

A system and method for portable computer battery management using host processing relocates analog and digital components needed to implement the SBDS standard from the battery pack to the computer, which processes the acquired battery data using the host processor. The battery pack requires only battery temperature and voltage sensing circuits, and an interface circuit for conveying the sensed data out of the battery pack. The portable computer includes a circuit which senses current provided to or drawn from the battery. Battery temperature, voltage and current data is provided to the computer's host system, which executes a battery management application program to determine battery status in accordance with the SBDS standard.

23 Claims, 2 Drawing Sheets

SYSTEM AND METHOD FOR BATTERY MANAGEMENT USING HOST PROCESSING

BACKGROUND OF THE INVENTION

1. Field of the Invention

This invention relates to the field of rechargeable battery systems, and particularly to rechargeable battery systems for portable computers.

2. Description of the Related Art

Many electronic products include rechargeable batteries which enable them to operate without connection to an AC power source. The status of the battery is often of critical importance to the product's user, as the product can operate only as long as the battery retains some useful life. For example, portable computers, such as notebook or laptop computers which are powered by a removable battery pack when not connected to an AC power source, typically provide a battery status screen to a user which might include data related to charge level, product aging, and an estimation of the remaining life for the battery housed within the pack.

Some recent portable computers have embedded a microprocessor, microcontroller, or complex finite state machine (FSM) inside the battery pack. Using this device in combination with a number of sensors and other electronics, voltage, temperature, current and various other variables are measured and processed with circuitry housed within the battery pack itself. Such battery packs are referred to as "Smart Batteries"; communication with the host computer is through an SMBus bus interface using function calls that adhere to the industry standard Smart Battery Data Specification (SBDS).

This results in a very complex and expensive battery pack. The circuitry required to implement a Smart Battery makes up a major part of the pack's electronics, which in turn make up a significant portion of the total cost of the battery pack. The battery pack industry is under continuous pressure to reduce the cost of their products. However, cost reduction is difficult with battery packs configured as described above.

SUMMARY OF THE INVENTION

A system and method for battery management using host processing is presented, which overcomes the problems noted above. Analog and digital components needed to implement the SBDS standard are relocated from the battery pack to the host computer, which processes the acquired battery data using the host system. This significantly reduces the cost and complexity of the battery pack.

The present invention requires that the battery pack include only a small number of components: a temperature sensing circuit which produces an output that varies with battery temperature, a voltage sensing circuit which produces an output that varies with the voltage across at least one of the cells of the battery, and an interface circuit for conveying the sensed temperature and voltage data out of the battery pack.

The computer with which the battery pack is used includes an interface circuit for receiving the temperature and voltage outputs from the battery pack. The portable computer also includes a current sensing circuit which produces an output that varies with the current provided to or drawn from the battery.

The portable computer houses a host system, which executes a battery management application program. The program is arranged to receive data representing battery temperature, voltage, and current, and to process the data as necessary to determine battery status. Data is preferably conveyed between the battery pack and the portable computer via an SMBus, and the host system preferably processes the received battery data in accordance with the SBDS standard.

Further features and advantages of the invention will be apparent to those skilled in the art from the following detailed description, taken together with the accompanying drawings.

DETAILED DESCRIPTION OF THE INVENTION

Figure 1:
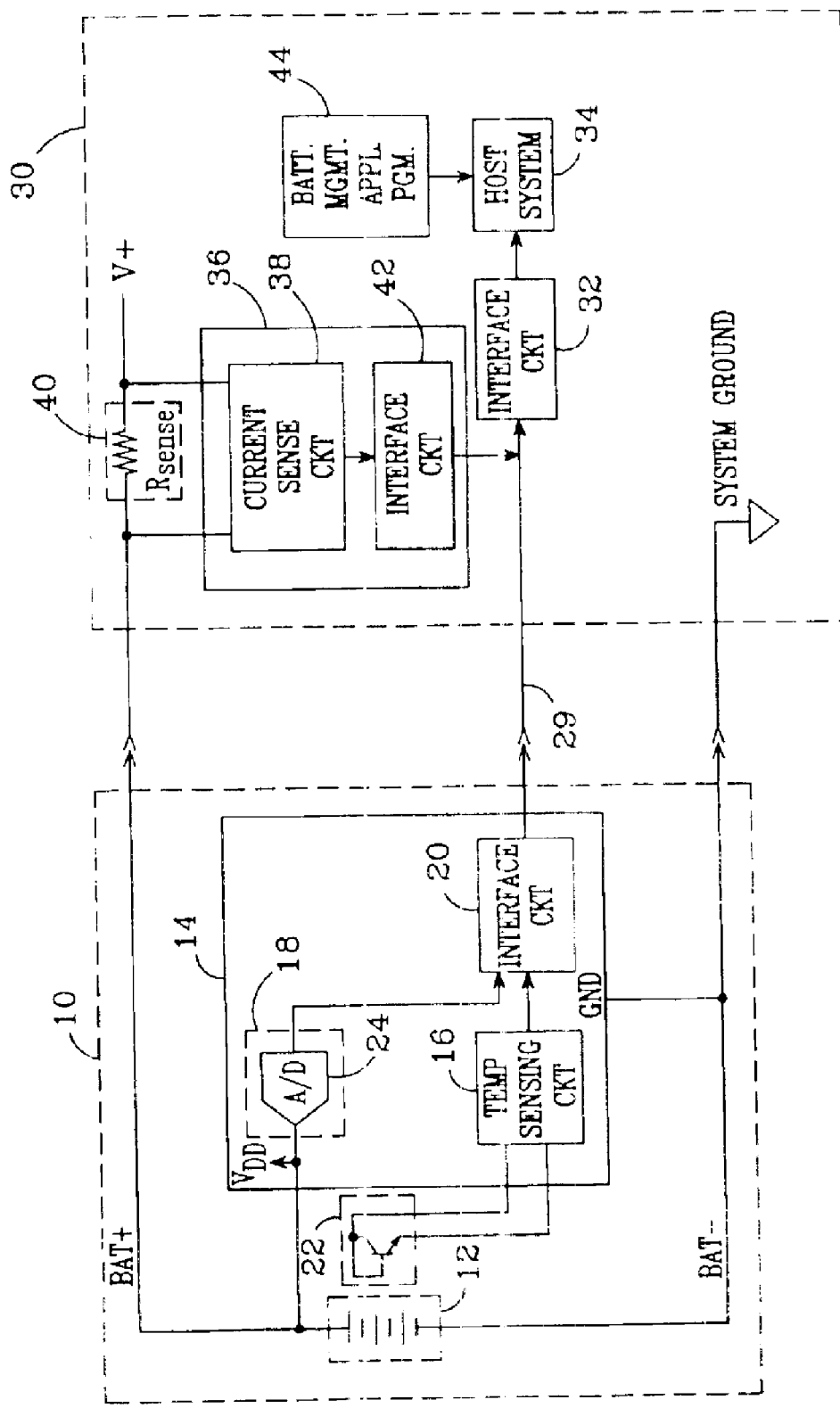
FIG. 1 is a block diagram illustrating the principles of a battery management system in accordance with the present invention.

A battery management system in accordance with the present invention is shown in FIG. 1. The system is used to determine the status of a rechargeable battery contained within a battery pack 10 having positive and negative terminals BAT+ and BAT−, respectively. As used herein, a "battery pack" refers to a portable, self-contained assembly which includes a rechargeable battery 12 and associated circuitry, which is suitable for powering a portable computer.

In accordance with the present invention, battery pack 10 includes a battery pack circuit 14, which comprises a temperature sensing circuit 16, a voltage sensing circuit 18, and an interface circuit 20. Temperature sensing circuit 16 provides an output which varies with the temperature of battery 12, as sensed with a temperature sensor 22. Voltage sensing circuit 18, preferably an analog-to-digital (A/D) converter 24, provides an output which varies with the voltage across at least one of the cells of battery 12; as shown in FIG. 1, circuit 18 senses the voltage across the entire battery. The outputs of sensing circuits 16 and 18 are provided to interface circuit 20, which conveys the temperature and voltage data out of battery pack 10 and to a portable computer via an interface bus 29. Battery pack circuit 14 is powered via connections to BAT+ and BAT−.

Battery pack 10 is intended for use with a portable computer 30, such as a laptop or notebook computer, which can operate on power provided by battery pack 10. Computer 30 includes an interface circuit 32 which receives the temperature and voltage data conveyed via interface bus 29 and makes it available to the portable computer's "host system" 34; computer 30 is preferably a Windows-based PC. Host system 34 might comprise, for example, the host processor, an embedded keyboard controller, or a system management controller responsible for managing system resources, in any combination. When host system 34 is the host processor, it is preferably a Pentium-type processor. Computer 30 includes a battery management circuit 36, which comprises a current sensing circuit 38 that produces an output which varies with the current provided to or drawn from battery pack 10. Current sensing circuit 38 would typically be connected across a sensing element 40, such as a resistor $R_{sense}$, which carries current provided to or drawn from battery pack 10. Battery management circuit 36 also includes an interface circuit 42 which conveys the output of current sense circuit 36 to interface bus 29 and thus to interface circuit 32.

Portable computer 30 also includes a battery management application program 44, which is executed by host system 34. Program 44 receives data representing the outputs of the battery's temperature, voltage, and current sensing circuits, and directs the host processor to process the data as necessary to determine battery status—such as battery voltage, temperature, and capacity, current provided to and drawn from the battery, and charge and discharge efficiency.

The present battery management system preferably adheres to the industry standard Smart Battery Data Specification (SBDS), which specifies the battery parameters which are to be acquired and processed. The necessary battery status processing is handled by battery management application program 44 which runs on host system 34. When the battery management system is arranged as described above, battery status processing capability and analog components which previously resided in the battery pack are relocated to the portable computer. This significantly reduces the cost and complexity of the battery pack, while still meeting the SBDS specification at the system level.

Figure 2:
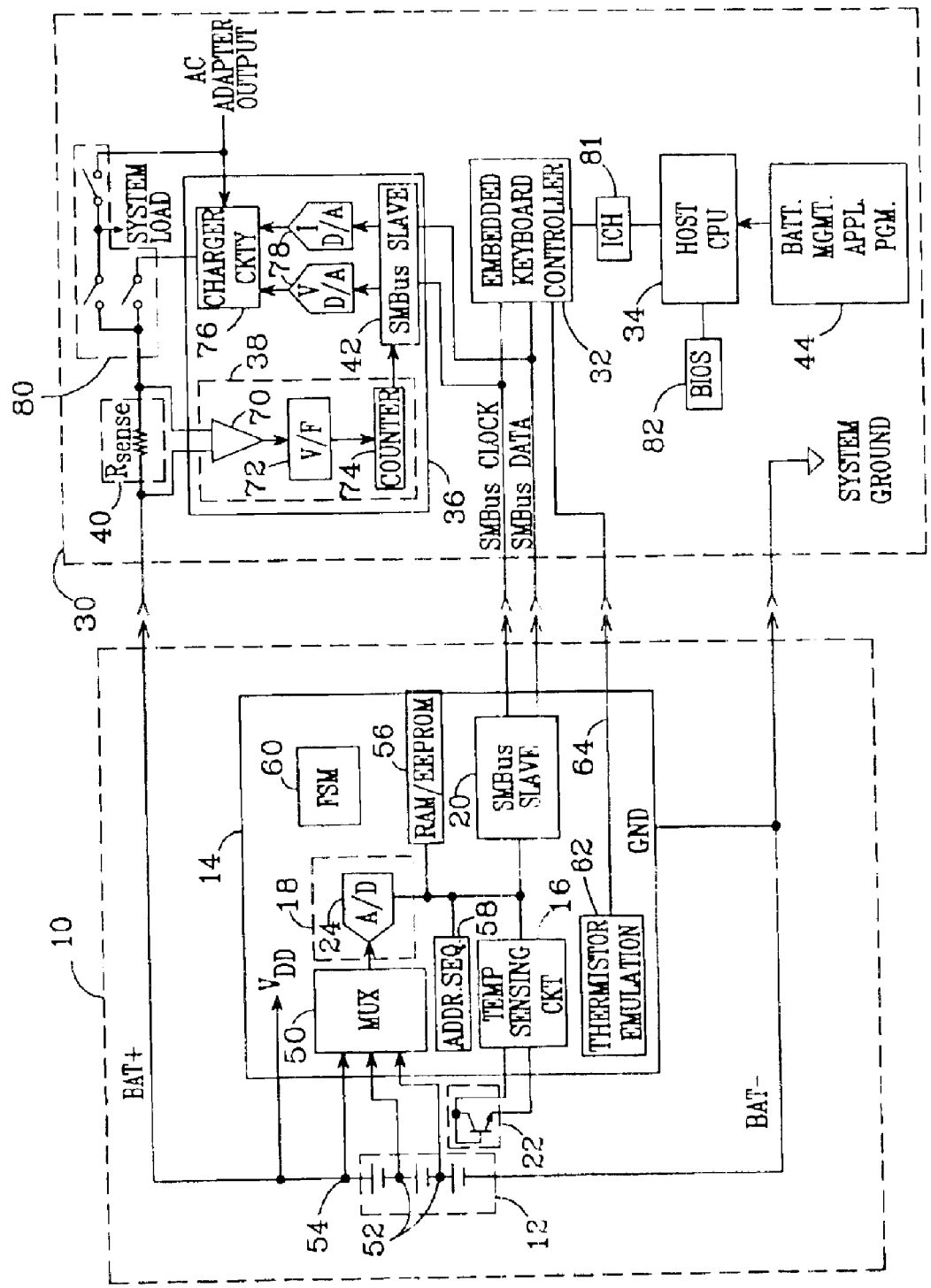
FIG. 2 is a block diagram of a preferred embodiment of a battery management system in accordance with the present invention.

A preferred embodiment of the present invention is shown in FIG. 2. Battery pack circuit 14 preferably includes a multiplexer 50 interposed between battery 12 and voltage sensing circuit 18. Battery 12 is typically made from multiple cells connected in series, with the cell-to-cell junctions 52 accessible. The multiplexer's inputs are connected to either the top 54 of the battery, or to a respective one of the cell-to-cell junctions 52; the multiplexer's output is connected to voltage sensing circuit 18. By sensing the voltage at each multiplexer input in turn, the voltage across the entire battery, and the voltage across each individual battery cell, can be determined.

Battery pack circuit 14 also preferably includes a storage means 56, such as RAM, which can store the sensed voltage and/or temperature data provided by voltage sensing circuit 18 and temperature sensing circuit 16, respectively. Storage means 56 may also include EEPROM, for example, to store manufacturer information. Measurement data may be stored at sequential memory locations using an address sequencer 58. The battery pack circuit also preferably includes a finite state machine (FSM) 60, which autonomously controls the operation of multiplexer 50 and address sequencer 58.

Battery pack circuit 14 may also include a thermistor emulation circuit 62 which provides a signal 64 to portable computer 30, in order to be backward-compatible with the hardware requirements of Smart Batteries.

The present battery management system preferably employs the standard SMBus interface for the communication of battery-related data between battery pack 10 and portable computer 30. When so arranged, interface circuit 20 is preferably an SMBus slave interface circuit, and data is conveyed to the portable computer via an SMBus DATA line and an SMBus CLOCK line. Storage means 56, voltage sensing circuit 18, and temperature sensing circuit 16 are preferably addressed directly through SMBus interface 20.

The current sense circuit 38 within the portable computer's battery management circuit 36 preferably comprises a differential amplifier 70 connected across current sensing element 40, a voltage-to-frequency (V/F) converter 72, and a coulomb counter 74. Amplifier 70 produces an output voltage which varies with the current provided to or drawn from battery pack 10. V/F converter 72 receives the amplifier's output and converts it to an oscillating waveform having a frequency which varies with the amplifier's output voltage; the V/F output drives coulomb counter 74. The current sense circuit is preferably arranged such that coulomb counter 74 counts up when current flows into battery pack 10, and counts down when current flows out of the battery pack. This arrangement makes possible a true summation of current. Battery capacity is typically specified in terms of coulombs; the counter output can be added to or subtracted from the battery's remaining capacity, and a percentage of the battery's total coulomb capacity can be calculated and stored for use by the battery management application program. The counter produces a digital output which represents the counter's internal count; the counter output is provided to the battery management circuit's interface circuit 42, which is preferably an SMBus slave circuit which connects to the SMBus DATA and CLOCK lines.

Battery management circuit 36 also preferably includes battery charger circuitry 76, which is controlled by the outputs of one or more digital-to-analog converters (DACs) 78 which are in turn controlled via interface circuit 42. The DACs set the charging current requested by the portable computer's host system 34, which in this preferred embodiment is the host processor. Charger circuitry 76 would typically be connected to receive the DC output of the portable computer's AC adapter, which provides the current controlled by the charger circuitry. The controlled charging current and the AC adapter output are preferably switchably connected to battery pack 10 and to the portable computer's system load via a switching network 80.

The portable computer's interface circuit 32 is preferably an SMBus master interface circuit, which is typically made part of an "embedded keyboard controller" (EC), which also typically includes keyboard interface circuitry and a microprocessor. This is the computer's internal SMBus interface, which connects to battery pack circuit 14 and any other internal SMBus-interfaced circuitry, such as battery management circuit 36. The EC controls the SMBus protocol. The EC may also perform data processing, though this is preferably handled by the computer's host processor.

A Windows-based PC also typically includes an "Input/output Control Hub (ICH) 81, which contains, for example, parallel and serial port circuitry. Data transfer between host processor 34 and embedded keyboard controller 32 is done through ICH 81.

A PC includes basic input-output software (BIOS) 82, which serves as an interface between the application being executed by host processor 34 and the computer's hardware. The present battery management system generally functions as follows: all battery data processing is performed using host processor 34. Battery status data is acquired when battery management application program 44 makes a function call to BIOS 82; appropriate function calls are defined under the SBDS standard. In response, the BIOS may make an SMBus call which acquires battery status data from battery pack circuit 14 and battery management circuit 36; the acquired data is then provided to battery management application program 44, which processes it in accordance with the SBDS standard using host processor 34.

Alternatively, BIOS 82 may intercept the function call and return the requested data to battery management application program 44 directly. This can occur if the system is arranged such that the BIOS periodically communicates with battery pack and battery management circuits 14 and 36 and has been acquiring the requested data as a background task; processing can be done using the EC as it communicates with the battery, or when directed to by the host processor. This is transparent to the battery management application program, which sees the returned data as if it came from a fully-compliant SBDS Smart Battery.

Windows-based portable computers typically employ several operating modes to conserve power. The present battery management system is preferably compatible with the computer's power conservation scheme. When the computer is operating in a normal fully-powered mode, the resources required to gather and process battery status data are already running, and thus no extra power is required to operate the battery management system. As noted above, BIOS 82 may make an SMBus call which acquires battery status data from battery pack circuit 14 and battery management circuit 36, or the BIOS may intercept the function call and return the requested data to battery management application program 44 directly.

When in a power conservation mode, battery status data may be acquired and processed when host processor 34 is powered up to perform other tasks. Alternatively, the host processor may be activated to acquire and process battery status data at preset intervals.

When the computer is in a "sleeping" mode and/or battery pack 10 is not installed in computer 30, battery status is not updated. For these cases, battery pack circuit 14 preferably has the capability to periodically wake up, read and store the battery voltage and temperature data in the battery pack's RAM 56, increment the RAM address for the next measurement data set, and return to a low power state. This occurs under the control of the battery pack's FSM 60. Battery status is then updated when the computer is turned on or when the battery is inserted into a running computer.

Battery pack circuit 14 and battery management circuit 36 are preferably packaged in respective integrated circuits (ICs), with the battery pack IC installed within battery pack 10, and the battery management IC installed on the PC's motherboard.

While particular embodiments of the invention have been shown and described, numerous variations and alternate embodiments will occur to those skilled in the art. Accordingly, it is intended that the invention be limited only in terms of the appended claims.

We claim:

1. A battery management system using host processing, comprising:
    a battery pack circuit housed within a battery pack which includes a rechargeable battery, said battery pack circuit comprising:
    a temperature sensing circuit which produces an output that varies with the temperature of said battery,
    a voltage sensing circuit which produces an output that varies with the voltage across said battery, and
    a first interface means for conveying said temperature sensing circuit output and said voltage sensing circuit output out of said battery pack for calculation of battery status by an external processor,
    a second interface means housed within a portable computer capable of being powered by said battery pack, said second interface means receiving said temperature sensing circuit output and said voltage sensing circuit output from said battery pack circuit,
    a battery management circuit housed within said portable computer and external to said battery pack circuit, said battery management circuit comprising a current sensing circuit which produces an output that varies with the current provided to or drawn from said battery pack,
    a host system which includes at least one processor housed within said portable computer, and
    a battery management application program which is executed by said host system, said program arranged to receive data representing the outputs of said battery temperature, voltage, and current sensing circuits and to perform all processing of said data required to determine battery status including battery capacity.

2. The battery management system of claim 1, wherein said voltage sensing circuit comprises an analog-to-digital converter (ADC) which converts the voltage across said battery to a digital value, said digital value being said voltage sensing circuit's output.

3. The battery management system of claim 2, wherein said battery comprises a plurality of cells connected in series, said battery pack circuit further comprising:
    a multiplexer connected between said ADC and a plurality of said battery's cell-to-cell junctions such that different ones of said cell-to-cell junctions can be connected to said ADC in response to a multiplexer control signal, and
    a controller arranged to provide said multiplexer control signal.

4. The battery management system of claim 3, wherein said controller is a finite state machine (FSM).

5. The battery management system of claim 1, wherein said first and second interface means are each SMBus interface circuits and said temperature sensing circuit output and said voltage sensing circuit output are conveyed from said battery pack to said portable computer via an SMBus connected between said first and second interface means.

6. The battery management system of claim 5, wherein said portable computer includes an embedded keyboard controller which includes said second interface circuit.

7. The battery management system of claim 6, wherein said embedded keyboard controller comprises at least one of said host system's processors.

8. The battery management system of claim 1, wherein said battery management circuit further comprises:
    charging circuitry which provides charging current to said battery in response to one or more control signals, and
    at least one digital-to-analog converter (DAC), each of which is connected to said SMBus at its input and provides a respective one of said control signals to said charging circuitry at its output.

9. The battery management system of claim 1, wherein said battery pack circuit further comprises a data storage means arranged to store said sensed voltage and temperature outputs.

10. The battery management system of claim 1, wherein said battery management system adheres to the Smart Battery Data Specification (SBDS), said battery management application program arranged to perform calculations required by said SBDS.

11. The battery management system of claim 10, wherein said first and second interface means are each SMBus interface circuits and said temperature sensing circuit output and said voltage sensing circuit output are conveyed from said battery pack to said portable computer via an SMBus connected between said first and second interface means, said battery management circuit further comprising an SMBus interface circuit which conveys said current sensing output to said host system, said portable computer further comprising:
    an embedded keyboard controller which includes said portable computer's SMBus interface circuit,
    basic input-output software (BIOS) which interfaces between said host system, said embedded keyboard controller, and
    said battery management circuit's SMBus interface circuit, said battery management system arranged such that it adheres to the Smart Battery Data Specification (SBDS), said battery management application program arranged to perform the calculations required by said SBDS by performing SBDS function calls to said BIOS, which is arranged to return SBDS data gathered from said battery pack circuit and said battery management circuit to said host system.

12. The battery management system of claim 1, wherein the battery status determined by said battery management program includes:
   battery voltage, temperature, and capacity,
   current provided to and drawn from said battery, and charge and discharge efficiency.

13. A battery management system using host processing, comprising:
   a battery pack circuit housed within a battery pack which includes a rechargeable battery, said battery pack circuit comprising:
      a temperature sensing circuit which produces an output that varies with the temperature of said battery,
      a voltage sensing circuit which produces an output that varies with the voltage across said battery, and
      a first interface means for conveying said temperature sensing circuit output and said voltage sensing circuit output out of said battery pack,
   a second interface means housed within a portable computer capable of being powered by said battery pack, said second interface means receiving said temperature sensing circuit output and said voltage sensing circuit output from said battery pack circuit,
   a battery management circuit housed within said portable computer, said battery management circuit comprising a current sensing circuit which produces an output that varies with the current provided to or drawn from said battery pack,
   a host system which includes at least one processor housed within said portable computer, and
   a battery management application program which is executed by said host system, said program arranged to receive data representing the outputs of said battery temperature, voltage, and current sensing circuits and to process said data to determine battery status,
   wherein said battery management circuit's current sensing circuit comprises:
      a current sense resistor connected to carry current provided to or drawn from said battery pack,
      a differential amplifier which provides an output that varies with the voltage developed across said current sense resistor,
      a voltage-to-frequency (V/F) converter which provides an output frequency which varies with said differential amplifier's voltage output,
      an up/down coulomb counter which counts up when current flows through said current sense resistor in a first direction, counts down when current flows through said current sense resistor in the opposite direction, and which produces a digital output that represents its internal count, and
      a third interface means which conveys said counter's output to said host system.

14. A battery management system which uses host processing and complies with the Smart Battery Data Specification (SBDS), comprising:
   a battery pack circuit housed within a battery pack which includes a multi-cell rechargeable battery, said battery pack circuit comprising:
      a temperature sensing circuit which produces an output that varies with the temperature of said battery,
      an analog-to-digital converter (ADC) which converts the voltage across at least one of the cells of said battery to a digital value,
      a data storage device arranged to store said ADC and temperature outputs, and
      a first SMBus interface circuit for conveying said temperature sensing circuit output and said ADC output out of said battery pack for calculation of battery status by an external processor,
   a second SMBus interface circuit housed within a portable computer capable of being powered by said battery pack, said second SMBus interface circuit receiving said temperature sensing circuit output and said ADC output from said battery pack circuit,
   a host processor housed within said portable computer,
   a battery management circuit housed within said portable computer and external to said battery pack circuit, said battery management circuit comprising:
      a current sensing circuit which produces an output that varies with the current provided to or drawn from said battery pack, and
      a third SMBus interface circuit which conveys said current sensing circuit output to said host processor,
   an SMBus which conveys data between said battery pack circuit, said battery management circuit, and said host processor, and
   a battery management application program which is executed by said host processor, said program arranged to receive data representing the outputs of said temperature, said ADC, and said current sensing circuit and to perform all calculations required by said SBDS to determine battery status including battery capacity.

15. The battery management system of claim 14, wherein said battery comprises a plurality of cells connected in series, said battery pack circuit further comprising:
   a multiplexer connected between said ADC and a plurality of said battery's cell-to-cell junctions such that different ones of said cell-to-cell junctions can be connected to said ADC in response to a multiplexer control signal, and
   a controller arranged to provide said multiplexer control signal.

16. The battery management system of claim 15, wherein said controller is a finite state machine.

17. The battery management system of claim 14, wherein said portable computer includes an embedded keyboard controller which includes said second SMBus interface circuit.

18. The battery management system of claim 17, wherein said portable computer further comprises:
   basic input-output software (BIOS) which interfaces between said host processor, said embedded keyboard controller, and said battery management circuit's SMBus interface circuit,
   said battery management application program arranged such that it performs the calculations required by said SBDS by performing SBDS function calls to said BIOS, which is arranged to return SBDS data gathered from said battery pack circuit and said battery management circuit to said host processor.

19. A battery management system which uses host processing and complies with the Smart Battery Data Specification (SBDS), comprising:
   a battery pack circuit housed within a battery pack which includes a multi-cell rechargeable battery, said battery pack circuit comprising:

a temperature sensing circuit which produces an output that varies with the temperature of said battery, an analog-to-digital converter (ADC) which converts the voltage across at least one of the cells of said battery to a digital value, a data storage device arranged to store said ADC and temperature outputs, and a first SMBus interface circuit for conveying said temperature sensing circuit output and said ADC output out of said battery pack, a second SMBus interface circuit housed within a portable computer capable of being powered by said battery pack, said second SMBus interface circuit receiving said temperature sensing circuit output and said ADC output from said battery pack circuit, a host processor housed within said portable computer, a battery management circuit housed within said portable computer, said battery management circuit comprising:
a current sensing circuit which produces an output that varies with the current provided to or drawn from said battery pack, and
a third SMBus interface circuit which conveys said current sensing circuit output to said host processor, an SMBus which conveys data between said battery pack circuit, said battery management circuit, and said host processor, and a battery management application program which is executed by said host processor, said program arranged to receive data representing the outputs of said temperature, said ADC, and said current sensing circuit and to perform calculations required by said SBDS to determine battery status, wherein said battery management circuit's current sensing circuit comprises:
a current sense resistor connected to carry current provided to or drawn from said battery pack,
a differential amplifier which provides an output that varies with the voltage developed across said current sense resistor,
a voltage-to-frequency (V/F) converter which provides an output frequency which varies with said differential amplifier's voltage output, and
an up/down coulomb counter which counts up when current flows through said current sense resistor in a first direction and which counts down when current flows through said current sense resistor in the opposite direction, and which produces a digital output that represents its internal count, said digital output provided to said host processor via said third SMBus interface circuit, said battery management circuit further comprising:
charging circuitry which provides charging current to said battery in response to a control signal, and
a digital-to-analog converter (DAC) which is connected to said SMBus at its input and which produces said control signal to said charging circuitry at its output.

20. A method of acquiring and processing battery status data for a rechargeable battery which is housed within a battery pack and used to power a portable computer in accordance with the Smart Battery Data Specification (SBDS), comprising:

sensing the voltage of said battery, sensing the temperature of said battery, sensing the current provided to or drawn from said battery, conveying said battery voltage, temperature, and current data out of said battery pack and to a host system which includes a processor within a portable computer capable of being powered by said battery for calculation of battery status by said processor, and performing all battery status calculations required by said SBDS using said processor.

21. The method of claim 20, wherein said battery voltage, temperature, and current data are conveyed to said host processor over an SMBus.

22. The method of claim 21, wherein said portable computer includes basic input-output software (BIOS) which interfaces between said processor and said SMBus, said SBDS calculations performed by said processor by executing a battery management application program which performs SBDS function calls to said BIOS, which returns SBDS data to said processor.

23. A method of acquiring and processing battery status data for a rechargeable battery used to power a portable computer in accordance with the Smart Battery Data Specification (SBDS), comprising:

sensing the voltage of said battery, sensing the temperature of said battery, sensing the current provided to or drawn from said battery, conveying said battery voltage, temperature, and current data to a host system which includes a processor within a portable computer capable of being powered by said battery, and performing calculations required by said SBDS using said processor, wherein said current is sensed by:
inserting a resistance in the conductive path which carries current between said battery and said portable computer,
sensing the voltage across said resistance,
generating an oscillating waveform having a frequency which varies with said sensed voltage, and
counting the oscillations present in said waveform such that the count is incremented when current flows through said resistance in a first direction and said count is decremented when current flows through said resistance in the opposite direction such that said count varies with said sensed current.

* * * * *